WAVE TRANSMISSION NETWORK USING TRANSISTOR

Filed Aug. 26, 1952 2 Sheets-Sheet 1

INVENTOR
J. T. BANGERT
BY
Ralph T. Holcomb
ATTORNEY

WAVE TRANSMISSION NETWORK USING TRANSISTOR

Filed Aug. 26, 1952 2 Sheets-Sheet 2

INVENTOR
J. T. BANGERT
BY
Ralph P. Holcomb
ATTORNEY

United States Patent Office 2,733,415

Patented Jan. 31, 1956

2,733,415

WAVE TRANSMISSION NETWORK USING TRANSISTOR

John T. Bangert, Summit, N. J., assignor to Bell Telephone Laboratories, Incorporated, New York, N. Y., a corporation of New York Application August 26, 1952, Serial No. 306,429

19 Claims. (Cl. 333—80)

Figure 1:
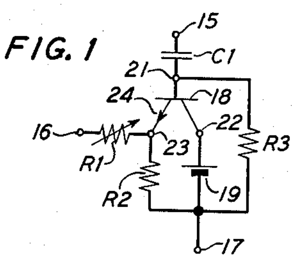

This invention relates to wave transmission networks and more particularly to networks employing a transistor to provide shunt negative resistance.

An object of the invention is to provide negative resistance of the shunt type. A further object is to improve the transmission characteristics of wave transmission networks, such as filters, by compensating the dissipation associated with the network branches.

In accordance with one embodiment of the invention, a transistor, a source of voltage, a capacitor, and three resistors are arranged to form a three-terminal network which in conjunction with reactive elements will provide a negative resistance of the shunt type, that is, one which is voltage-controlled or short-circuit stable. The transistor is of the type having a base, a collector, and an emitter. The capacitor is connected between the base and the first network terminal, the first resistor is connected between the emitter and the second terminal, the second resistor between the emitter and the third terminal, the third resistor between the base and the third terminal, and the voltage source between the collector and the third terminal. The first resistor may be made adjustable to control the magnitude of the negative resistance.

In accordance with a further embodiment of the invention, a three-terminal active network of this type is associated with a reactive impedance branch of a wave transmission network to compensate the undesired energy dissipation associated with the network. The first and third terminals of the network are connected to the respective ends of the branch, and the second terminal to an intermediate point on the branch. The impedance branch may comprise only an inductor or an inductor in parallel with a capacitor, and may include additional reactive elements. The intermediate point on the branch to which the second network terminal is connected may be a tapping point on an inductor or the common terminal between two series-connected capacitors. As examples of networks to which the invention is applicable, band-elimination, high-pass, confluent band-pass, and *m*-derived band-pass filters of the ladder type are disclosed. The negative resistance may be incorporated in either a series or a shunt branch of the filter. Preferably, the negative resistance is made of the proper magnitude to compensate not only the dissipation in the branch to which it is connected but also that associated with one or more of the other filter branches, especially throughout the pass band and in the regions of transition from transmission to attenuation. The transmission characteristics of the filters are thus greatly improved by sharpening the cut-offs, reducing and flattening the loss in the pass bands, and increasing the attenuation in the suppression bands.

Figure 2:
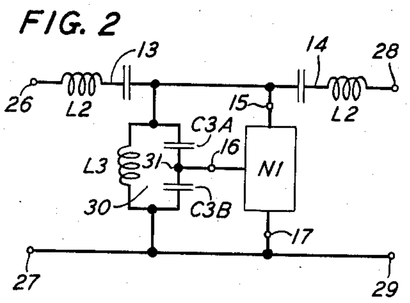
Figure 3:
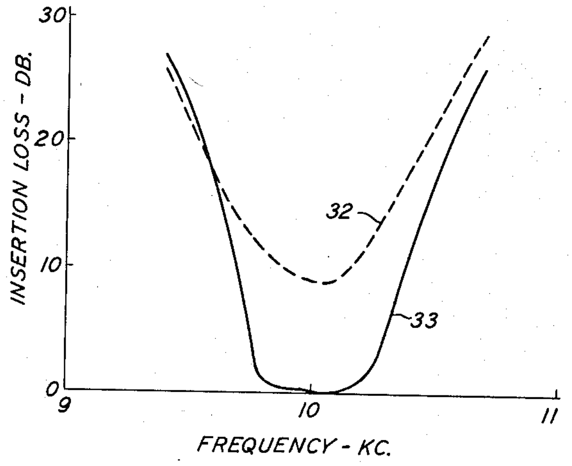
Figure 4:
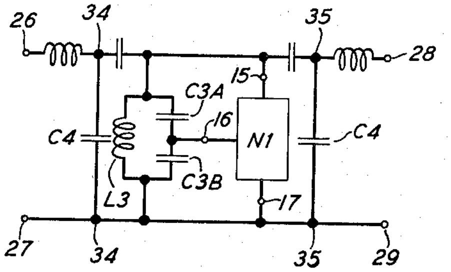
Figure 6:
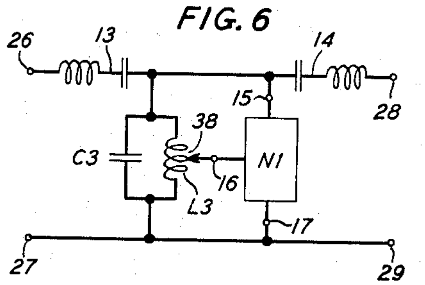
Figure 5:
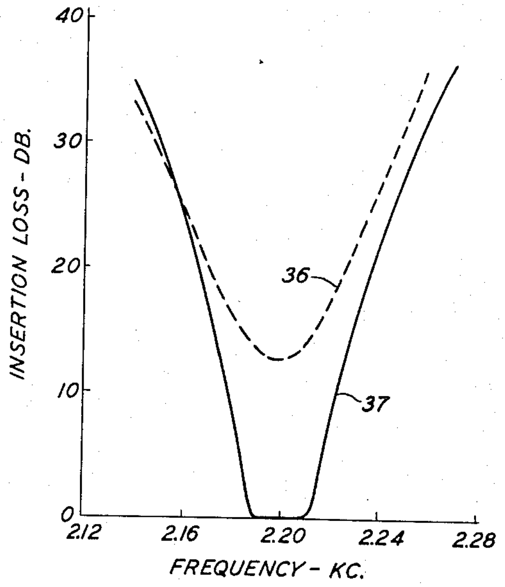
Figure 7:
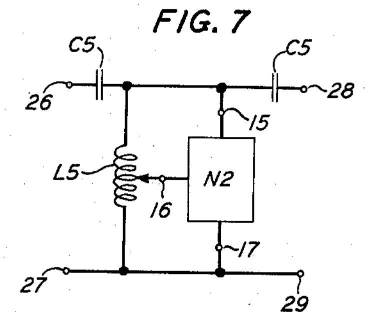
Figure 9:
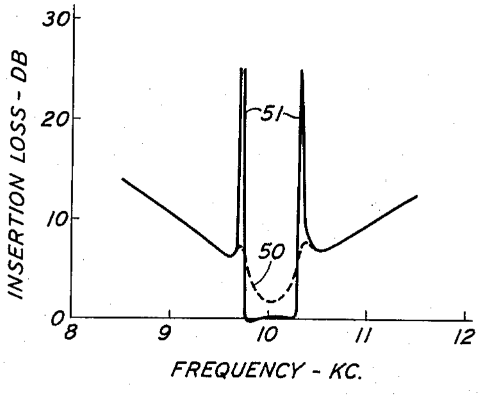
Figure 8:
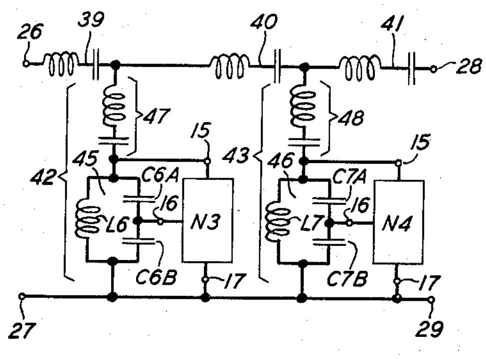
Figure 10:
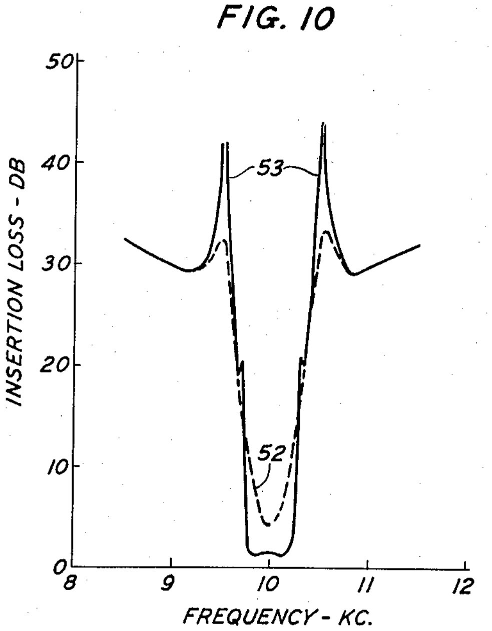
Figure 11:
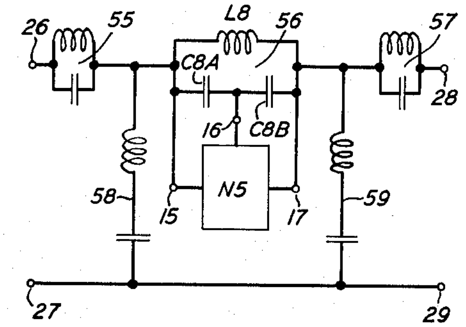

The nature of the invention and its various objects, features, and advantages will appear more fully in the following detailed description of preferred embodiments illustrated in the accompanying drawing, of which:

Fig. 1 is a schematic circuit of a three-terminal active network in accordance with the invention;

Figs. 2, 4, and 6 are schematic circuits of confluent band-pass wave filters embodying the invention;

Figs. 3 and 5 are insertion loss-frequency characteristics showing the improvement obtainable by adding the three-terminal networks to the filters of Figs. 2 and 4, respectively;

Figs. 7, 8, and 11 are schematic circuits, respectively, of a high-pass, an *m*-derived band pass, and a band-elimination filter embodying the invention; and Figs. 9 and 10 are insertion loss-frequency characteristics obtainable, respectively, with a single section and with two sections of the type shown in Fig. 8.

The embodiment of the three-terminal active network in accordance with the invention shown schematically in Fig. 1 comprises the terminals 15, 16, and 17, a transistor 18, a source of direct voltage 19, a capacitor C1, and three resistors R1, R2, and R3. The transistor 18 comprises a base, a collector, and an emitter connected, respectively, to the terminals 21, 22, and 23. The transistor may be either of the point-contact type or the junction type, but the latter is preferred because, in general, it provides a more constant value of negative resistance for given applied potentials. Transistors of the junction type are described in detail, for example, in the paper by William Shockley entitled "The theory of p–n junctions in semiconductors and p–n junction transistors," published in the Bell System Technical Journal, vol. XXVIII, pages 435 to 489, July 1949, and those of the point-contact type in United States Patent 2,524,035, to John Bardeen and Walter H. Brattain, issued October 3, 1950. In Fig. 1, the symbol used for the transistor 18 indicates that it is of the junction type, inasmuch as the arrowhead 24 associated with the emitter points toward the terminal 23. In the symbol for a point-contact transistor, this arrowhead is reversed.

As shown in Fig. 1, the capacitor C1 is connected between the transistor base terminal 21 and the network terminal 15, resistor R1 is connected between the emitter terminal 23 and the network terminal 16, the resistor R2 between the terminal 23 and the network terminal 17, the resistor R3 between the terminal 21 and the terminal 17, and the voltage source 19 between the collector terminal 22 and the terminal 17. The resistor R1 may be made adjustable, as indicated by the arrow, to control the magnitude of the negative resistance.

Some advantages of a three-terminal active network employing a transistor instead of a thermionic device as the active element are that the transistor does not require an evacuated or gas-filled envelope, or a heated cathode, requires no warm-up time, has very little heat to be dissipated, consumes much less power, is smaller and lighter, and has a longer useful life.

A three-terminal active network of the type shown in Fig. 1 is well adapted for compensating the energy dissipation associated with reactive impedance branches of wave transmission networks. Figs. 2, 4, 6, 7, 8, and 11 show, by way of example only, additional embodiments of the invention in which the network of Fig. 1 is associated with a reactive impedance branch of a wave filter for this purpose.

Fig. 2 shows a mid-series terminated, confluent, band-pass filter section of the ladder type. The filter has a pair of input terminals 26, 27, to which a suitable source of alternating-current signals may be connected, and a pair of output terminals 28, 29, to which a suitable load impedance may be connected. The section shown is of the unbalanced type, and the terminals 27 and 29 may be grounded or otherwise fixed in potential. Each of the series impedance branches 13 and 14 is constituted by an inductor L2 in series with a capacitor. The interposed shunt branch comprises a reactive impedance 30 made up of an inductor L3 shunted by the two series capacitors C3A and C3B. A three-terminal active network N1, which may be of the type shown in Fig. 1 having terminals 15, 16, and 17, is associated with the impedance 30. The terminal 15 is connected to the high side of the impedance 30, the terminal 17 to the low or grounded side, and the terminal 16 to an intermediate point. As shown, this intermediate point is the common terminal 31 between the series capacitors C3A and C3B, which may be equal or unequal in value. However, if these capacitors are made approximately equal, the network is less sensitive to changes in their values and is, therefore, more stable with time.

The network N1 furnishes enough energy to compensate the energy dissipation in the branch 30, especially throughout the transmission band and in the transition regions. It may be adjusted to annul also part or all of the dissipation associated with the series branches 13 and 14, although the resistance of these terminal branches may be partly or entirely allowed for in choosing the source impedance connected to the terminals 26, 27, and the load impedance connected to the terminals 28, 29. Thus, only a single active element is required in order to obtain a greatly improved transmission characteristic from the filter section.

The broken-line curve 32 of Fig. 3 shows a typical insertion loss-frequency characteristic obtainable with the filter of Fig. 2 when the network N1 is omitted, the cut-off frequencies are placed at 9.8 and 10.2 kilocycles, and the inductors L2 and L3 have Q values, respectively, of 137 and 23 at the mid-band frequency. For comparison, the solid-line curve 33 shows the transmission characteristic obtainable with the same filter when the network N1 is added. It is seen that the loss in the transmission band is reduced and flattened, the cut-offs sharpened, and the attenuation in the lower suppression band increased. For this characteristic, the capacitance of C1 was 0.1 microfarad and the resistances of R1, R2, and R3 had the values, respectively, of 20, 3400, and a million ohms.

Fig. 4 shows a confluent band-pass filter circuit which is similar to the one of Fig. 2 except that an impedance transformation has been provided at two internal points 34—34 and 35—35 by adding the shunt capacitors C4, C4. The impedance level of the portion of the filter between the points 34—34 and 35—35 may thus be increased. As a result, the impedance into which the transistor 18 works is raised, the current handled by the transistor reduced, and the performance of the network N1 improved.

The broken-line curve 36 of Fig. 5 shows a typical insertion loss characteristic for a filter of the type shown in Fig. 4 when the network N1 is omitted, the mid-band frequency is 2.20 kilocycles, and the theoretical band width is 20 cycles. The solid-line characteristic 37 shows the improvement attributable to the addition of the network N1.

The confluent band-pass filter section shown in Fig. 6 is similar to the one shown in Fig. 2 except that the terminal 16 of the three-terminal active network N1 is connected to a tapping point 38 on the inductor L3. The inductor L3 may be tapped at any point, but preferably approximately at its electrical center in the interest of stability. The two portions are inductively coupled so that the inductor L3 operates as an autotransformer. The two series capacitors C3A and C3B may be replaced by a single equivalent capacitor C3, as shown.

Fig. 7 shows a mid-series, low-pass, ladder-type filter section comprising two equal series capacitors C5 and an interposed shunt inductor L5. The terminals 15 and 17 of a three-terminal active network N2, which may be of the type shown in Fig. 1, are connected, respectively, to the high end and the low end of the inductor L5. The third terminal 16 of N2 is connected to a tapping point, preferably the center, of the conductor L5, and the two portions of L5 are inductively coupled.

Fig. 8 shows two tandem-connected, mid-series, band-pass, *m*-derived filter sections of the ladder type comprising three series impedance branches 39, 40, and 41, and two shunt branches 42 and 43. Each series branch is constituted by an inductor in series with a capacitor. Each shunt branch comprises a series-resonant impedance in series with a parallel-resonant impedance. In the shunt branch 42, the parallel-resonant impedance 45 is made up of two series capacitors C6A and C6B, preferably equal, shunted by an inductor L6. The parallel-resonant impedance 46 in the shunt branch 43 is constituted by two preferably equal series capacitors C7A and C7B in shunt with an inductor L7. The three-terminal active networks N3 and N4, which may be of the type shown in Fig. 1, are associated, respectively, with the shunt branches 42 and 43. The terminals 15 and 17 of the network N3 are connected, respectively, to the high side and the low side of the impedance 45, and the third terminal 16 to the common terminal of the series capacitors C6A and C6B. The terminals of the network N4 are connected in a similar manner to the impedance 46. The network N3 is designed to compensate the energy dissipation in the parallel-resonant impedance 45, that in the series-resonant impedance 47, and part or all of that associated with the series branches 39 and 40. Similarly, the network N4 overcompensates the dissipation in the impedance 46 in order to take care also of the dissipation in the impedance 48, and part or all of that in the branches 40 and 41.

In Fig. 9, the broken-line curve 50 shows a typical insertion loss-frequency characteristic obtainable with a single filter section of the type shown in Fig. 8 when the three-terminal active network is omitted, the theoretical cut-offs are placed at 9.85 and 10.20 kilocycles, *m* is equal to 0.546, and comparatively low-Q inductors are used. The solid-line characteristic 51 shows the great improvement effected by adding the three-terminal active network to the filter circuit. It is seen that the peaks of loss are greatly increased, the level of loss and the variation of loss in the pass band are reduced, and, most importantly, the cut-offs are much sharper.

The broken-line curve 52 of Fig. 10 shows an insertion loss-frequency characteristic obtained with the two tandem-connected filter sections shown in Fig. 8 when the three-terminal active networks N3 and N4 are omitted, one of the sections has an *m* of 0.546, and the other section has an *m* of 0.861. The solid-line curve 53 shows the characteristic obtained with the same filter by adding the networks N3 and N4. The excellence of the characteristic is evident from the symmetry, the sharpness of cut-off, and the flatness in the pass band. The networks N3 and N4 could be adjusted, by means of the control resistor R1, to make the loss in the band substantially zero, if desired.

The invention may also be applied to a series impedance branch of a wave transmission network. For example, Fig. 11 shows two tandem-connected, mid-series, confluent, band-elimination filter sections of the ladder type employing a three-terminal active network N5 associated with a series branch. Each of the series branches 55, 56, and 57 is parallel resonant. The intermediate series branch 56 comprises an inductor L8 shunted by two preferably equal capacitors C8A and C8B in series. Each of the shunt branches 58 and 59 is constituted by an inductor in series with a capacitor. The terminals 15 and 17 of the network N5, which may be of the type shown in Fig. 1, are connected to the respective ends of the impedance branch 56. The third network terminal 16 is connected to the common terminal of the capacitors C8A and C8B. It is to be understood that, alternatively, the terminal 16 may be connected to a tapping point on the inductor L8. The network N5 is designed and adjusted to compensate the dissipation in the branches 56, 58, and 59, and also part or all of that associated with the end series branches 55 and 57. Here again, as in the other filter circuits described, the addition of the active network N5 serves to make the cut-offs much sharper and to increase the attenuation in the suppression band.

It is to be understood that the above-described arrangements are illustrative of the application of the principles of the invention. Numerous other arrangements may be devised by those skilled in the art without departing from the spirit and scope of the invention.

What is claimed is:

1. In combination, a reactive impedance branch and means for compensating dissipation therein comprising a transistor having a base, a collector, and an emitter, a source of voltage connected between said collector and one end of said branch, a resistor connected between said emitter and said one end, a capacitor connected between said base and the other end of said branch, and a second resistor connected between said emitter and an intermediate point on said branch.

2. The combination in accordance with claim 1 in which said second resistor is adjustable.

3. The combination in accordance with claim 1 which includes a third resistor connected between said base and said one end.

4. The combination in accordance with claim 1 in which said transistor is of the junction type.

5. The combination in accordance with claim 1 in which said branch comprises two series-connected capacitors and said intermediate point is the common terminal of said capacitors.

6. The combination in accordance with claim 5 in which said capacitors are approximately equal in value.

7. A band-pass wave filter of the ladder type comprising a series impedance branch and a shunt impedance branch, said shunt branch comprising a series-resonant impedance in series with a parallel-resonant impedance including two series-connected capacitors, and means for compensating dissipation in said shunt branch comprising a transistor having a base, a collector, and an emitter, a source of voltage connected between said collector and one end of said parallel-resonant impedance, a resistor connected between said emitter and said one end, a capacitor connected between said base and the other end of said parallel-resonant impedance, and a second resistor connected between said emitter and the common terminal of said capacitors.

8. A filter in accordance with claim 7 which includes a third resistor connected between said base and said one end.

9. A filter in accordance with claim 7 in which said second resistor is adjustable.

10. A filter in accordance with claim 7 in which said transistor is of the junction type.

11. In combination, a reactive impedance branch and a negative-resistance network for compensating dissipation therein, said network comprising a transistor, a source of voltage, and a resistor, said transistor having a base, a collector, and an emitter, one end of said branch being connected to said base, said source being connected between said collector and the other end of said branch, and said resistor being connected between said emitter and an intermediate point on said branch.

12. The combination in accordance with claim 11 in which said transistor is of the junction type.

13. The combination in accordance with claim 11 in which said resistor is adjustable.

14. The combination in accordance with claim 11 in which said network includes a second resistor connected between said emitter and the other end of said branch.

15. The combination in accordance with claim 11 in which said branch comprises two series-connected capacitors and said intermediate point is located between said capacitors.

16. The combination in accordance with claim 15 in which said capacitors are approximately equal in value.

17. The combination in accordance with claim 11 in which said network includes a capacitor connected between said base and said branch.

18. The combination in accordance with claim 17 in which said network includes a second resistor connected between said emitter and the other end of said branch.

19. The combination in accordance with claim 18 in which said network includes a third resistor connected between said base and the other end of said branch.

References Cited in the file of this patent

UNITED STATES PATENTS

| | | |
|---|---|---|
| 1,557,229 | Zobel | Oct. 13, 1925 |
| 1,725,154 | Marsteller | Aug. 20, 1929 |
| 1,772,506 | Affel | Aug. 12, 1930 |
| 1,900,045 | Crisson | Mar. 7, 1933 |
| 2,556,286 | Meacham | June 12, 1951 |
| 2,556,296 | Rack | June 12, 1951 |
| 2,663,766 | Meacham | Dec. 22, 1953 |